UNITED STATES PATENT OFFICE.

HOWARD J. FORCE, OF SCRANTON, PENNSYLVANIA.

METHOD OF TREATING PORTLAND AND SIMILAR CEMENT.

1,085,977.  Specification of Letters Patent.  Patented Feb. 3, 1914.

No Drawing.  Application filed September 13, 1912. Serial No. 720,157.

*To all whom it may concern:*

Be it known that I, HOWARD J. FORCE, a citizen of the United States, residing at Scranton, in the county of Lackawanna and State of Pennsylvania, have invented a new and useful Improvement in Methods of Treating Portland and Similar Cements, of which the following is a specification.

In the methods of testing Portland and similar cement for tensile strength heretofore practised, the cement was made into briquets having a cross section of one square inch, then allowed to set for twenty-four hours in a moist closet, and then broken in a machine for testing tensile strength. Similar briquets have also been subjected to a boiling test before being broken, which test consisted in boiling the briquets under atmospheric pressure for the purpose of ascertaining whether or not the briquets would become cracked or disintegrated in boiling water. Cements which have successfully withstood these tests have nevertheless failed when made into concrete, for the reason that they contained a considerable percentage of large or coarse granules which did not readily absorb water or become hydrated in mixing the cement with water preparatory to testing samples of the cement and which afterward, when the cement had been used for making concrete, had absorbed water and caused a swelling, disruption or disintegration of the concrete.

The object of this invention is to provide a test which will effectually show the character of the cement as to permanency or durability when made into concrete.

In practising this invention briquets are made up of neat cement with a sufficient quantity of water to make a fairly plastic mass. These briquets are made in the usual brass molds having a cross section of one square inch and are placed in a moist closet where they are kept for twenty-four hours. At the expiration of this time a number of these briquets, usually three, are broken in a testing machine, and another like number of the same briquets are boiled under pressure for about two hours. The pressure is preferably about 20 atmospheres or 285 pounds per square inch, which pressure is conveniently produced by placing the briquets in an autoclave or digester which contains water of about 70° F., then closing the autoclave and then raising the temperature of the water by means of a gas flame or other suitable source of heat. It takes usually about an hour to reach a pressure of 285 pounds and this pressure is maintained for about an hour. Upon the expiration of this time the flame is extinguished and the pressure is blown off, which usually takes about twenty minutes. The briquets are then taken from the water and if they have not been injured by the boiling they are placed in a moist closet for about half an hour. The briquets are then weighed and the gain or loss in weight is noted and the briquets are then broken in a testing machine.

It has been found that only cement which is sound in every way and suitable for producing a sound and lasting concrete will resist boiling under pressure successfully. Cements which will pass this test successfully are such which have been carefully manufactured by grinding the ingredients very finely, for instance so that 85 per cent. of the ground material will pass through a sieve of 200 mesh to the inch, then calcined or burned at a high temperature, for instance 2700° F., and then again ground to about the same fineness, or cements which are made of ingredients which have been thoroughly seasoned for several months after calcination. Inferior cements which are liable to produce unreliable concrete will crack or disintegrate when boiled under pressure or show a decided loss in tensile strength. Practice has shown that a pressure of 285 pounds to the square inch is very effective for producing the conditions which will bring to light the character or quality of the cement under treatment, but this pressure may be varied as circumstances may require. The pressure should, however, exceed 50 pounds to the square inch in order to produce the desired result within a reasonable period of time and the higher the pressure is kept the quicker the desired result is reached.

One of the advantages of this process is that the briquets will be in condition for testing after a treatment of a few hours' duration.

A satisfactory quality of cement will show a considerable increase of tensile strength after having been boiled under pressure as compared with the same cement which has not been so treated, the increase being twenty-five per cent. or more and an unsatisfactory quality of cement will crumble or disintegrate under the treatment herein described. The tensile strength of the cement treated under pressure should not be less than 400 pounds per square inch. The gain in weight by the cement during the boiling under pressure should not exceed one per cent.

The same test is also desirable for ascertaining the character of the cement with reference to expansion. For that purpose expansion bars are made of the cement mixed with water in the usual way with a cross section of about 1 square inch and a length of about 6 inches. The bars are then placed in a moist closet and at the expiration of twenty-four hours are carefully measured. They are then placed in the autoclave and boiled under pressure as above described, and at the end of that treatment are again measured. Cements which are constant in volume should not show expansion of over one-half of one per cent. when tested under the above described conditions. The pressures mentioned herein are measured from the atmospheric pressure as the zero.

I claim as my invention:

1. In the method of preparing solid bodies of Portland or similar cement for testing the same the herein described treatment which consists in boiling such cement bodies under a pressure which exceeds fifty pounds to the square inch.

2. In the method of preparing solid bodies of Portland or similar cement the herein described treatment which consists in boiling such cement bodies under a pressure approximating two hundred and eighty-five pounds to the square inch.

Witness my hand, this 7 day of Sept., 1912.

HOWARD J. FORCE.

Witnesses:
D. R. REESE,
C. H. FARNHAM.